H. HOLLINGSWORTH.
Forks for Platting Hedges.
No. 154,252. Patented Aug. 18, 1874.
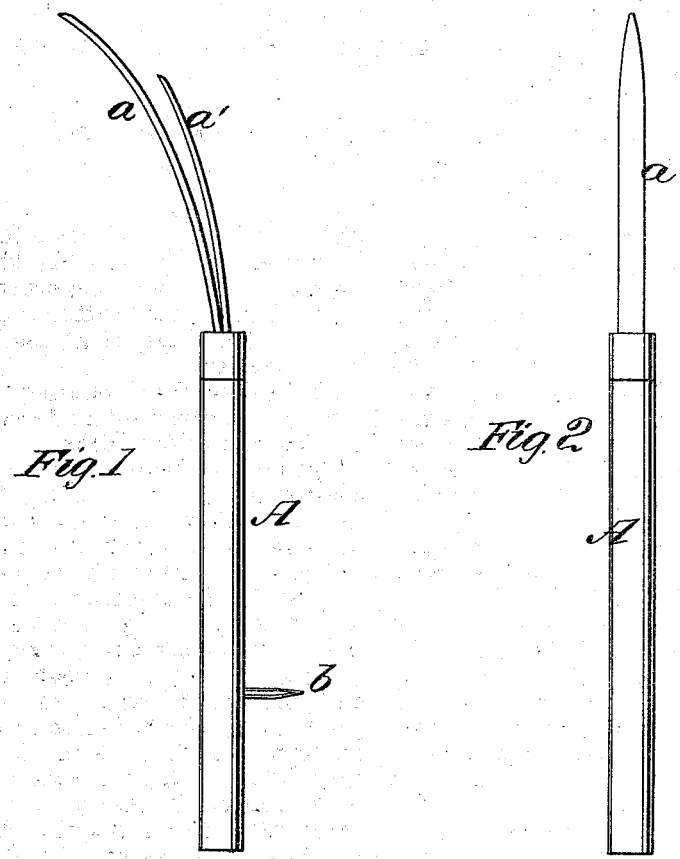

UNITED STATES PATENT OFFICE.

HENRY HOLLINGSWORTH, OF ECONOMY, INDIANA.

IMPROVEMENT IN FORKS FOR PLATTING HEDGES.

Specification forming part of Letters Patent No. 154,252, dated August 18, 1874; application filed July 18, 1874.

*To all whom it may concern:*

Be it known that I, HENRY HOLLINGS-WORTH, of Economy, in the county of Wayne and State of Indiana, have invented a new and valuable Improvement in Fork for Platting Hedge; and I do hereby declare that the following is a full, clear, and exact description of the construction and operation of the same, reference being had to the annexed drawings, making a part of this specification, and to the letters and figures of reference marked thereon.

Figures 1 and 2 of the drawings are representations of side views of my fork for platting hedge.

The object of this invention is to facilitate the platting or plashing of hedge-plants for the purpose of making a closely-interwoven hedge; and the novelty of my invention consists in the use of forks having two curved tines—a short tine and a long one—secured in one end of a handle, which is provided with a spike for holding the instrument in proper position during the platting operation.

In the annexed drawings, A designates the handle of the improved instrument, which may be of any desired length, and which has two blades or tines, $a$ $a'$, firmly secured into one end. The blades $a$ $a'$, which may be of round or flat metal, are curved in the same direction, and the blade $a$ is somewhat longer than the blade $a'$, for a purpose hereinafter explained, and the two blades diverge from the end of the handle to their points for the purpose of allowing them to be applied on plants of different sizes. The handle A has secured to it, at right angles to its length, a spike, $b$, the object of which is to secure the instrument to the ground while platting the plants, and thus hold the plants in proper position during this platting operation. The spike or stake $b$ may be adjustable on the handle, if desired.

In the operation of platting I use two of the instruments described, and commence by first putting one of the forks on a plant in the hedge-row, so that when such plant is brought against this row by running the long blade through the row, the short blade will be under the long one. I then stake the instrument to the ground, which holds the plant properly in its place. I then take the other fork and adjust the next plant to its place, and lap it over the first plant, extending it beyond the latter, and running the long blade under the same and through the hedge, so as to bring the plant against the hedge, and fasten it as I did the first. The first fork can then be taken up, and with it another plant adjusted to its place in the hedge. At the end of the row the last plant will be fastened with a stake.

What I claim as new, and desire to secure by Letters Patent, is—

A hedge-platting fork composed of tines $a$ $a'$, and a spike, $b$, inserted into a handle, A, substantially as described.

In testimony that I claim the above I have hereunto subscribed my name in the presence of two witnesses.

HENRY HOLLINGSWORTH.

Witnesses:
 JOHN M. WILLIAMS,
 C. J. WILLIAMS.